United States Patent
Ozaki et al.

[11] Patent Number: 5,730,036
[45] Date of Patent: Mar. 24, 1998

[54] METHOD OF CUTTING ELLIPSE CONTOUR WITH NUMERICALLY-CONTROLLED MACHINE TOOLS

[75] Inventors: Yasuo Ozaki; Masato Tominaga, both of Shizuoka-ken, Japan

[73] Assignee: Kabushiki Kikai Kabushiki Kaisha, Tokyo, Japan

[21] Appl. No.: 535,949

[22] Filed: Sep. 28, 1995

[30] Foreign Application Priority Data

Oct. 7, 1994 [JP] Japan ................................ 6-244014

[51] Int. Cl.$^6$ .................................................. B23B 35/00
[52] U.S. Cl. ........................... 82/1.3; 408/1 R; 409/199
[58] Field of Search .......................... 82/1.11, 1.2, 1.3; 408/1 R, 3; 364/718; 409/199

[56] References Cited

U.S. PATENT DOCUMENTS

| | | | |
|---|---|---|---|
| 3,763,363 | 10/1973 | Saita et al. | 364/718 |
| 3,823,626 | 7/1974 | Bakewell | 82/1.11 |
| 3,958,471 | 5/1976 | Muller | 82/1.11 |
| 4,648,295 | 3/1987 | Ley et al. | 82/1.3 X |
| 4,651,599 | 3/1987 | Ley | 82/1.3 X |
| 4,790,222 | 12/1988 | Morgan | 82/1.3 |
| 4,868,475 | 9/1989 | Rogozinksi et al. | 318/632 |
| 5,201,618 | 4/1993 | Malarz et al. | 409/199 |

*Primary Examiner*—Daniel W. Howell
*Assistant Examiner*—Henry W. H. Tsai
*Attorney, Agent, or Firm*—Finnegan, Henderson, Farabow, Garrett & Dunner, L.L.P.

[57] ABSTRACT

There is provided a method of cutting an ellipse contour in a numerically-controlled machine tool which can to cut a target ellipse precisely while considering the diameter of the tool, and to machine a three-dimensional ellipse surface as well as a rotated ellipse locus. This method is for controlling the coordinate position of a tool T such that the velocity of the contact point of the tool with the workpiece W in a tangential direction becomes constant with an eccentric angle $\theta$ relative to the major axis of the ellipse E as a parameter. This method comprises the step of controlling the coordinate position $(x_n, y_n)$ of the center of the tool to track along the path being away from the ellipse E in the normal direction by a distance corresponding to the radius r of the tool.

5 Claims, 5 Drawing Sheets

FIG. 4

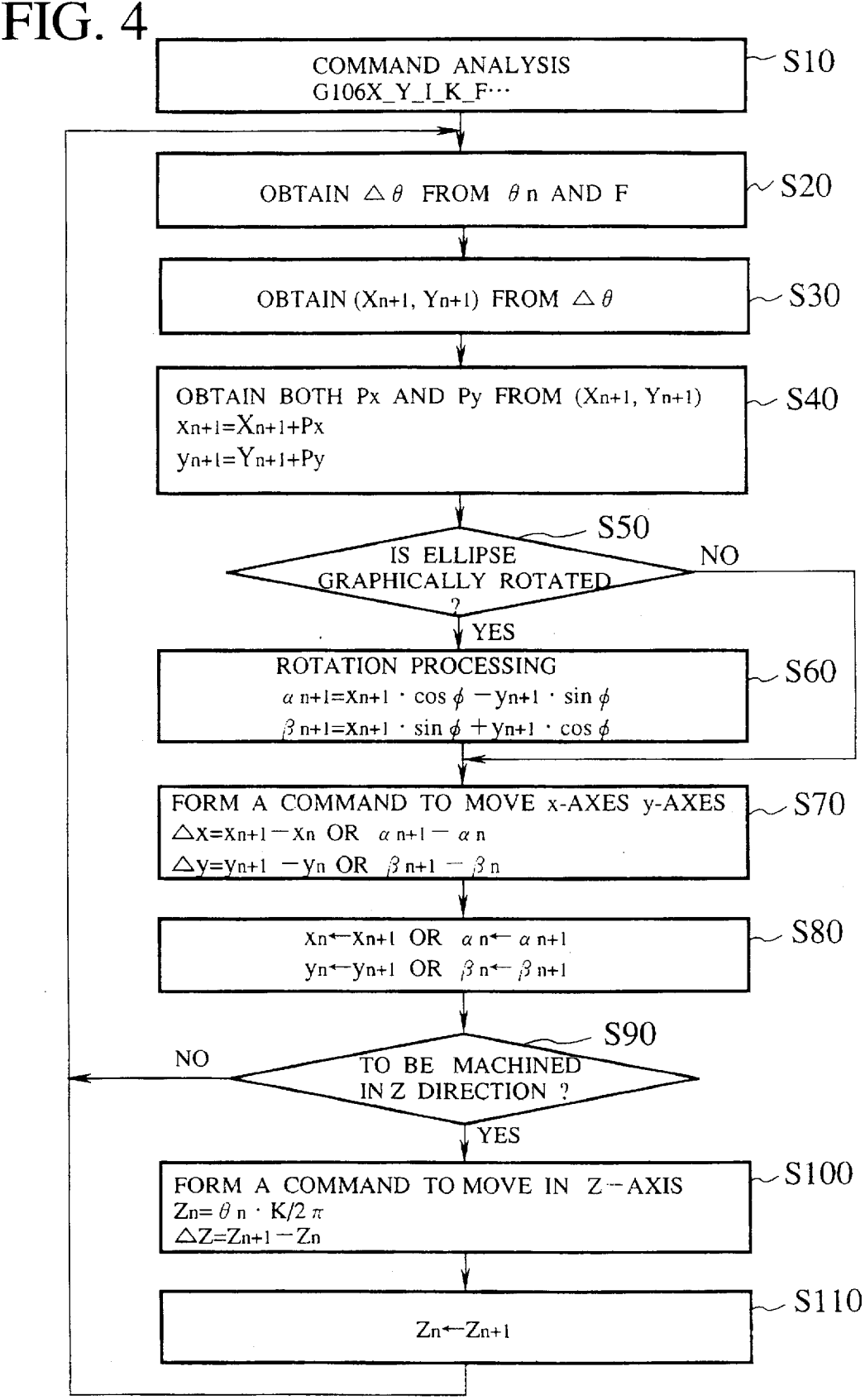

- S10: COMMAND ANALYSIS G106X_Y_I_K_F···
- S20: OBTAIN $\triangle\theta$ FROM $\theta n$ AND F
- S30: OBTAIN $(X_{n+1}, Y_{n+1})$ FROM $\triangle\theta$
- S40: OBTAIN BOTH Px AND Py FROM $(X_{n+1}, Y_{n+1})$
  $x_{n+1}=X_{n+1}+Px$
  $y_{n+1}=Y_{n+1}+Py$
- S50: IS ELLIPSE GRAPHICALLY ROTATED?
- S60: ROTATION PROCESSING
  $\alpha_{n+1}=x_{n+1}\cdot\cos\phi - y_{n+1}\cdot\sin\phi$
  $\beta_{n+1}=x_{n+1}\cdot\sin\phi + y_{n+1}\cdot\cos\phi$
- S70: FORM A COMMAND TO MOVE x-AXES y-AXES
  $\triangle x=x_{n+1}-x_n$ OR $\alpha_{n+1}-\alpha_n$
  $\triangle y=y_{n+1}-y_n$ OR $\beta_{n+1}-\beta_n$
- S80: $x_n \leftarrow x_{n+1}$ OR $\alpha_n \leftarrow \alpha_{n+1}$
  $y_n \leftarrow y_{n+1}$ OR $\beta_n \leftarrow \beta_{n+1}$
- S90: TO BE MACHINED IN Z DIRECTION?
- S100: FORM A COMMAND TO MOVE IN Z-AXIS
  $Z_n = \theta n \cdot K/2\pi$
  $\triangle Z = Z_{n+1} - Z_n$
- S110: $Z_n \leftarrow Z_{n+1}$

METHOD OF CUTTING ELLIPSE CONTOUR WITH NUMERICALLY-CONTROLLED MACHINE TOOLS

BACKGROUND OF THE INVENTION

The present invention relates to a method of cutting an ellipse contour in a workpiece with a numerically-controlled machine tool.

As a method of cutting an ellipse contour in a workpiece with a numerically-controlled machine tool, Japanese Publication of Application No. 6-59719 discloses to control the coordinate position of the tool such that the velocity of the contact point of the tool with the workpiece in a tangential direction becomes constant with an eccentric angle relative to the major axis of the ellipse as a parameter.

Let the center of the ellipse be the coordinate origin, a straight line passing through the origin be x-axis, another straight line perpendicular to the x-axis be y-axis, the radius on the major axis of the ellipse be A, the radius on the minor axis of the ellipse be B, and an eccentric angle relative to the x-axis be q, then the coordinate position (X, Y) of the contact point of the tool with the ellipse is expressed in the equations (1a) and (1b) by using the eccentric angle q as a parameter.

$$X = A \cdot \cos \theta \quad (1a)$$

$$Y = B \cdot \sin \theta \quad (1b)$$

The equations (1a) and (1b) can be discretely expressed as follows:

$$X_n = A \cdot \cos \theta_n \quad (2a)$$

$$Y_n = B \cdot \sin \theta_n \quad (2b)$$

$$\theta_{n+1} = \theta_n + \Delta\theta \quad (3)$$

According to the equations (2a) and (2b), the velocity of the contact point of the tool with the workpiece in a tangential direction is expressed in the equation (4).

$$\Delta F = \sqrt{((X_{n+1} - X_n)^2 + (Y_{n+1} - Y_n)^2)} \quad (4)$$

A target ellipse can be obtained by means of controlling $\Delta\theta$ so as to keep $\Delta F$ constant in the equations (2a), (2b) and (3).

Substitute the equations (2a), (2b) and (3) in the equation (4), and provide the condition that $\Delta\theta$ is sufficiently small, $\Delta\theta$ can be expressed in the following equation (5).

$$\Delta\theta = \Delta F \sqrt{(A^2 \sin^2 \theta_n + B^2 \cos^2 \theta_n)} \quad (5)$$

Calculate the coordinate position (Xn+1, Yn+1) of the point on the ellipse to which the tool moves, and calculates the difference from the coordinate position (Xn, Yn) of the point obtained at the previous sampling, then $$\Delta X = X_{n+1} - X_n \quad (6a)$$

$$\Delta Y = Y_{n+1} - Y_n \quad (6b)$$

can be given, where $\Delta X$ and $\Delta Y$ are the amount of the movement in the x-axis and the y-axis, respectively, per one sample time.

When a rotating tool such as an end mill is used, no target ellipse can be obtained merely by means of correcting the major and minor radius A and B, respectively, of the target ellipse in calculating the equations (2a) and (2b) by the length corresponding to the radius of the tool, unlike in a case of cutting a circle locus.

SUMMARY OF THE INVENTION

The present invention is made to solve the above mentioned problem, and an object thereof is to provide a method of cutting an ellipse in a workpiece with a numerically-controlled machine tool which can cut a target ellipse precisely while considering the diameter of the tool, and machine a three-dimensional ellipse surface as well as a rotated ellipse locus.

In order to achieve the above mentioned object, according to an aspect of the present invention, there is provided a method of cutting an ellipse contour in a worlpiece in a numerically-controlled machine tool by means of controlling the coordinate position of the tool such that the velocity of the contact point of the tool with the workpiece in a tangential direction becomes constant with an eccentric angle relative to the major axis of the ellipse as a parameter, characterized in that the method comprises the step of controlling the tool such that the center of the tool tracks along the coordinate positions which is away from the ellipse in the normal direction by a distance corresponding to the radius of the tool.

In the method of cutting an ellipse contour with a numerically-controlled machine tool according to the present invention, the step of controlling the tool may include the step of controlling the coordinate position of the tool such that the tool moves to the direction perpendicular to the plane of the ellipse contour in synchronism with the movement of the tool to cut the ellipse contour.

Furthermore, in the method of cutting an ellipse contour with a numerically-controlled machine tool according to the present invention, the step of controlling the tool may include the step of correcting the coordinate position of the tool according to an angular displacement of the ellipse in rectangular coordinate system on the plane of the ellipse.

By controlling the tool such that the center of the tool tracks along the coordinate positions being away from the ellipse in the normal direction by a distance corresponding to the radius of the tool, the center of the tool moves along the path being away from the ellipse by the distance corresponding to the radius of the tool in the normal direction at the points on the ellipse to provide a target ellipse contour.

By controlling the coordinate position of the tool such that the tool moves to the direction perpendicular to the plane of the ellipse in synchronism with the movement of the tool to cut the ellipse contour, continuous cutting can be made in the direction perpendicular to the plane of the ellipse to machine an ellipse contour, that is, to manufacture a three-dimensional ellipse surface continuously in the vertical direction.

By correcting the coordinate position of the tool according to an angular displacement of the ellipse in rectangular coordinate system on the plane of the ellipse, an ellipse can be obtained at an angularly displaced position.

BRIEF DESCRIPTION OF THE DRAWING

FIG. 4 is a flow chart of a main routine carded out to achieve a method of cutting an ellipse contour with a numerically-controlled machine tool according to the present invention.

DESCRIPTION OF THE PREFERRED EMBODIMENT

An embodiment of the present invention will now be described in detail with reference to the accompanying drawings.

Figure 1:
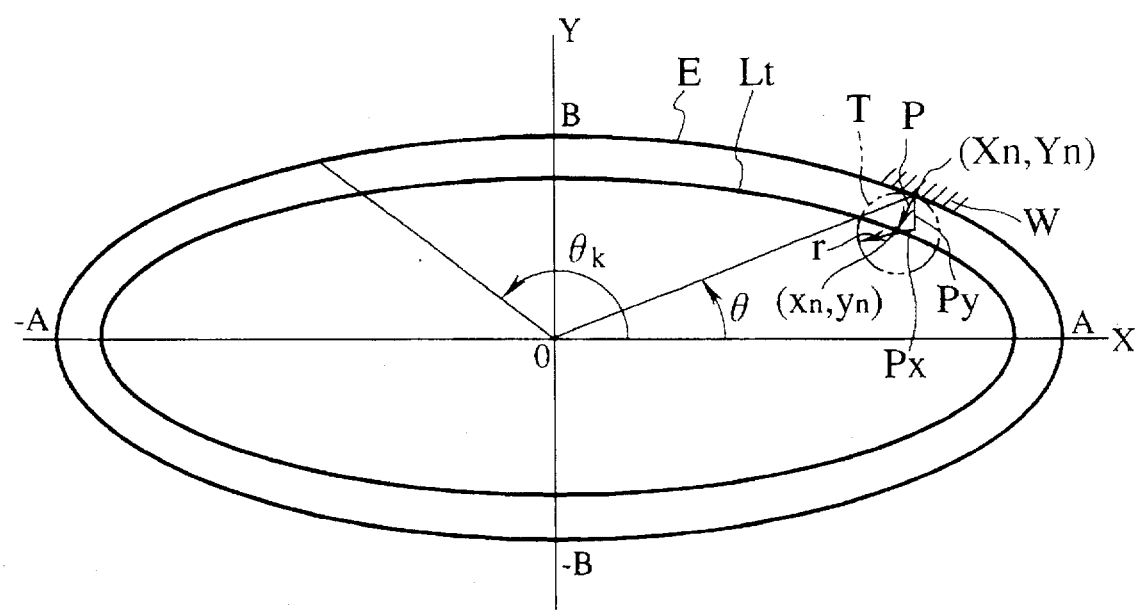
FIG. 1 is a view showing the relation between an ellipse and the coordinate system in which a method of cutting an ellipse contour with a numerically-controlled machine tool according to the present invention is implemented, in the case where the position of the center of the tool is corrected by the radius of the tool inside the ellipse.
Figure 2:
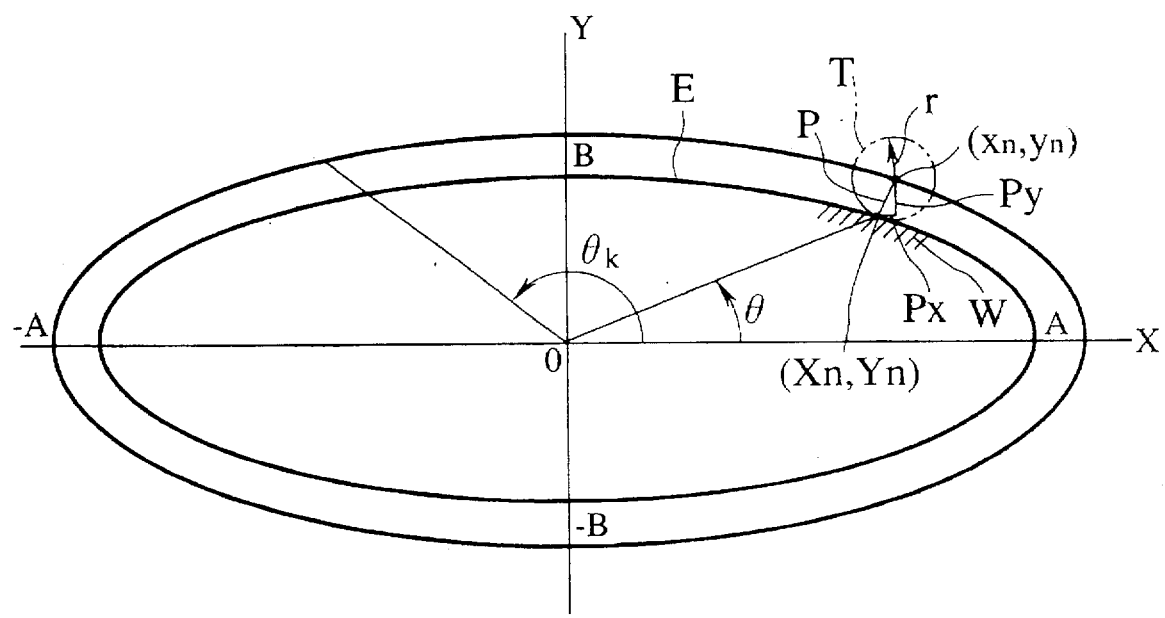
FIG. 2 is a view showing the relation between an ellipse and the coordinate system in which a method for cutting an ellipse contour with a numerically-controlled machine tool according to the present invention is implemented, in the case where the position of the center of the tool is corrected by the radius of the tool outside the ellipse.

FIGS. 1 and 2 show the relation between a coordinate system and an ellipse cut with a numerically-controlled machine tool the position of which is defined with two straight axes. FIG. 1 shows the case where the position of the center of the tool is corrected by the radius of the tool inside the ellipse, and FIG. 2 shows the case where the position of the tool is corrected by the radius of the tool outside the ellipse.

In FIGS. 1 and 2, the ellipse to be cut is denoted as E and its center is denoted as origin O. A straight line passing through origin O is identified as the x-axis, and another straight line passing through origin O perpendicular to the x-axis is identified as the y-axis. The radius on the major and minor axes of the ellipse are A and B, respectively. The angular displacement from the x-axis to the coordinate position $(X_n, Y_n)$ of the contact point of the tool T with the workpiece W on the ellipse E is represented by eccentric angle θ.

Let r be the radius of the tool T. The center of the tool is so controlled to be kept to follow the path away from the ellipse E by the distance of the tool radius r in normal direction. The center of the tool thus tracks a locus (this locus is hereinafter referred to as a corrected locus Lt) away from the ellipse to be cut by the distance r in normal direction.

As the corrected locus Lt is not a similar with the ellipse E to be cut, it is necessary to obtain coordinate position of a point on the corrected locus Lt, i.e., the coordinate position $(x_n, y_n)$ of the center of the tool, from the coordinate position $(X_n, Y_n)$ of the contact point calculated in the equations (2a) and (2b).

At first, calculated is the vector in tangential direction at the point $(X_n, Y_n)$ where the tool T and the workpiece W contact with each other on the ellipse E. Differentiation of the equations (1a) and (1b) with the eccentric angle θ gives:

$$dX/d\theta = -A \sin \theta = -Y \cdot A/B \quad (7a)$$

$$dY/d\theta = B \cos \theta = X \cdot B/A \quad (7b)$$

Next, a vector from the coordinate position of the contact point $(X_n, Y_n)$ to the point where the normal line from that contact point crosses the corrected locus Lt, that is, the coordinate position $(x_n, y_n)$ of the center of the tool is called a corrected vector P for the sake of convenience. Components (Px, Py) of the corrected vector P are expressed in these equations (8a) and (8b), supposing r denotes the radius of the tool.

$$Px = \pm rXn/\sqrt{((A^2/B^2)^2 Yn^2 + Xn^2)} \quad (8a)$$

$$Py = \pm rYn/\sqrt{((B^2/A^2)^2 Xn^2 + Yn^2)} \quad (8b)$$

The sign ± in the equations (8a) and (8b) expresses one of both cases where the center of the tool T stands inside of the ellipse E (see FIG. 1) or outside of E (see FIG. 2), or one of the other couple of cases where the tool T goes along the ellipse E clockwise or counterclockwise.

The coordinate position $(x_n, y_n)$ of the center of the tool on the corrected locus Lt, which corresponds to the point $(X_n, Y_n)$ on the ellipse E, is the point offset from the point $(X_n, Y_n)$ by vector P and is expressed in these equations (9a) and (9b).

$$x_n = X_n + Px \quad (9a)$$

$$y_n = Y_n + Py \quad (9b)$$

Next, calculate the point $(x_{n+1}, y_{n+1})$ on the corrected locus Lt according to the point $(X_{n+1}, Y_{n+1})$ on the ellipse E to obtain the difference from the previously sampled point $(x_n, y_n)$ on the corrected locus Lt as follows:

$$\Delta x = x_{n+1} - x_n \quad (10a)$$

$$\Delta y = y_{n+1} - y_n \quad (10b)$$

Let Δx and Δy be the mount of the movement in the x-axis and the y-axis, respectively, per one sample time.

As noted above, calculation of the tool position to move subsequently on the corrected locus Lt according to the basic equations (2a) and (2b) for the ellipse E enables the precise cutting of the ellipse without accumulation of error regardless of the radius r of the tool and number of times to repeat calculation.

Though, if the center of the tool passes inside of the ellipse E, the workpiece W may be overcut in the direction of the major axis of the ellipse E in the case where the radius r of the tool does not satisfy the following requirement. Consideration for dealing with such a case is necessary.

$$r \leq B^2/A \quad \text{(On condition A} \geq \text{B)} \quad (11)$$

In the case the coordinate system is set up as shown in FIGS. 1 and 2, where the starting position of the ellipse E is denoted as (A,0), tangential velocity decided by command block of a numerically-controlled unit is denoted as F, the radius on the major and minor axes of the ellipse are denoted as A and B, respectively, and rotation angle to the terminal point is denoted as θk, the numerically-controlled unit calculates the following sample equations in the range $\theta_n = 0 - \theta k$.

$$\Delta\theta_n = (F \cdot S)/\sqrt{(A^2 \sin^2\theta_n + B^2 \cos^2\theta_n)} \quad (12a)$$

$$\theta_n + \theta_{n-1} + \Delta\theta_n \quad (12b)$$

$$\Delta X_n = A(\cos\theta_n - \cos\theta_{n-1}) \quad (12c)$$

$$\Delta Y_n = B(\sin\theta_n - \sin\theta_{n-1}) \quad (12d)$$

$$Px = \pm rX_n/\sqrt{((A^2/B^2)^2 Y_n^2 + X_n^2)} \quad (12e)$$

-continued $$Py = \pm rY_n / \sqrt{((B^2/A^2)^2 X_n^2 + Y_n^2)} \tag{12f}$$

$$x_n = X_{n-1} + \Delta X_n + Px \tag{12g}$$

$$y_n = Y_{n-1} + \Delta Y_n + Py \tag{12h}$$

$$\Delta x_n = x_n - x_{n-1} \tag{12i}$$

$$\Delta y_n = y_n - y_{n-1} \tag{12j}$$

where S denotes Sampling cycle, and n denotes sampling times. Initial values $\theta_0$, $X_0$, $Y_0$, $x_0$ and $y_0$ are as follows.

$$\theta_0 = 0, X_0 = A, Y_0 = 0, x_0 = A \pm r, y_0 = 0$$

Equations (12a) through (12j) are calculated and $\Delta x_n$ and $\Delta y_n$ are outputted to position control means as X- and Y-axis position control value par one sampling time.

Hereafter there is described the case of machining in the direction perpendicular to the plane on which the ellipse is located.

Let K be a distance of movement per full circumference of the ellipse E on the plane perpendicular to the ellipse E implemented by the command of movement. As the eccentric angle $\theta$ at the coordeinate position of the contact point on the ellipse E is calculated in equation (3), the relation of Z-distance $Z_n$ in the coordinates and eccentric angle $\theta$ is found as follows:

$$Z_n = \theta_n \cdot K/2\pi \tag{13}$$

The movement distance $\Delta Z$, at a sampling in the vertical direction is found as follows:

$$\Delta Z = Z_n - Z_{n-1} \tag{14}$$

As noted above, the position onto which the tool is to come next can be calculated by using eccentric angle $\theta$ of the ellipse E as the absolute parameter. With this process, the ellipse E can be cut exactly without causing accumulated error in the vertical direction in spite of the radius r of the tool and number of repetition times of calculation.

Therefore, $\Delta X$, $\Delta Y$ and $\Delta Z$ in the case of the machining in direction perpendicular to the plane on which the ellipse E is located are found by equations (2a), (2b), (3), (5) and (8a), (8b) through (10b) and (13), (14) on the assumption that the radius r of the tool is greater than zero.

Figure 3:
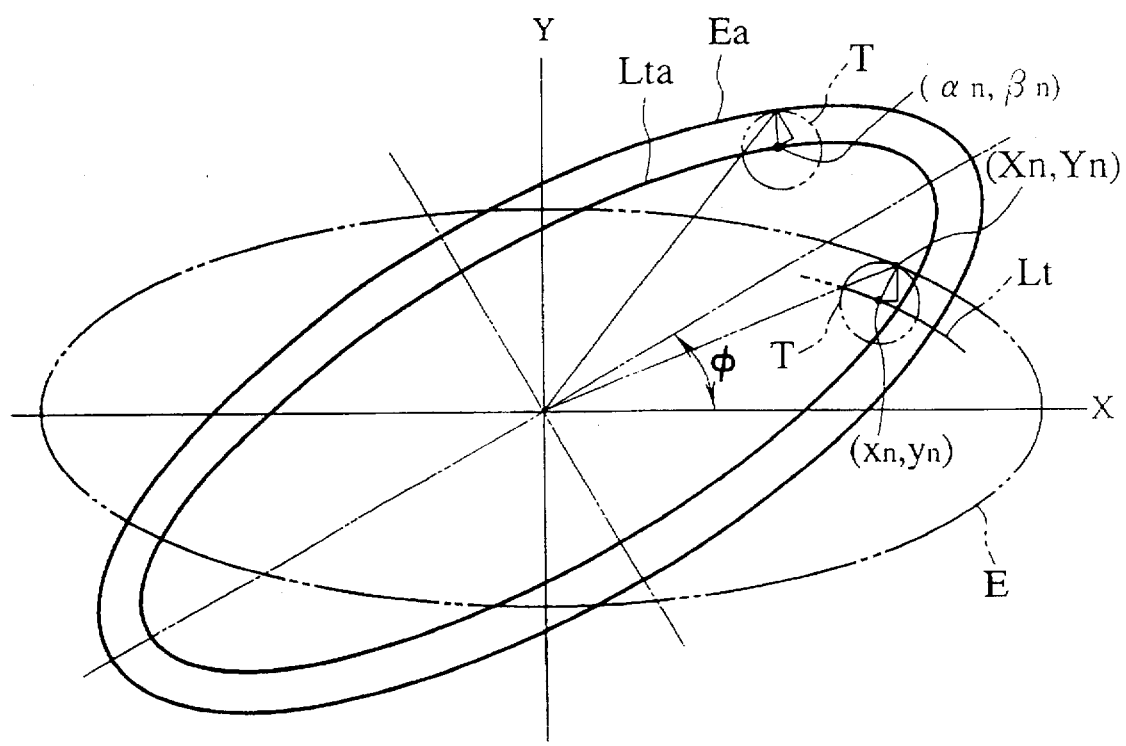
FIG. 3 is a view showing the relation between an ellipse and the coordinate system in which a method of cutting an ellipse contour with a numerically-controlled machine tool according to the present invention is implemented, in the case where the ellipse is graphically rotated.

FIG. 3 shows the case the ellipse E rotates around the origin O on the plane on which the ellipse E is located. Let the rotated ellipse be Ea and the corrected locus where Ea is corrected by the radius r of the tool be Lta for the sake of convenience.

As illustrated in FIG. 3, the coordinate position $(x_n, y_n)$ of the center of the tool on the corrected locus Lt, that corresponds to the contact point $(X_n, Y_n)$ on the ellipse E is calculated, according to equations (9a) and (9b). Also calculate $(\alpha_n, \beta_n)$, the position of the center of the tool on the graphically rotated corrected locus Lta according to equations (15a) and (15b). Let graphical rotation angle be $\phi$.

$$\alpha_n = x_n \cdot \cos\phi - y_n \cdot \sin\phi \tag{15a}$$

$$\beta_n = x_n \cdot \sin\phi + y_n \cdot \cos\phi \tag{15a}$$

Also, according to $(\alpha_{n-1}, \beta_{n-1})$, the position of the center of the tool on the graphically rotated corrected locus Lta that is previously sampled, $\Delta\alpha$ and $\Delta\beta$ are found as follows:

$$\Delta\alpha = \alpha_n - \alpha_{n-1} \tag{16a}$$

$$\Delta\beta = \beta_n - \beta_{n-1} \tag{16b}$$

where $\Delta\alpha$, $\Delta\beta$ are the X- and Y-distance of movement respectively par one sampling time.

As noted above, $(\alpha_n, \beta_n)$, the coordinate position of the center of the tool on the graphically rotated corrected locus Lta can be calculated according to the position of corresponding point on locus of the ellipse E. With this process, the ellipse Ea can be cut exactly without causing accumulated error in the vertical direction in spite of the radius r of the tool and number of repetition times of calculation.

Hereafter, the case of the machining in the direction perpendicular to the plane on which the ellipse is located is described, where the ellipse is rotated on the plane above noted around the origin.

As the graphical rotation of ellipse has no influence to the movement in the vertical direction, the distance of movement in vertical (Z-axis) direction is found by equations (13) and (14).

Hereafter, the processing flow to execute the cutting of an ellipse according to the present invention is described with reference to FIG. 4.

At first, the command of command block to numerically-controlled unit is analized to get the radiuses on the major and minor axes of the ellipse A, and B, the radius r of the tool, the velocity F in tangential direction and other numerals (Step 10).

Then, $\Delta\theta_n$ is calculated by using $\theta_n$, A, B and F according to equation (12a) (Step 20), and also both $X_{n+1}$ and $Y_{n+1}$ are calculated from $\Delta\theta_n$. (Step 30).

Then Px and Py are calculated by using $X_{n+1}$ and $Y_{n+1}$, and the following equation (Step 40) is operated to execute corrective processing by the radius of the tool:

$$x_{n+1} = X_{n-1} + Px$$

$$y_{n+1} = Y_{n+1} + Py$$

Then it is judged whether the ellipse is graphically rotated or not (Step 50). In the case the ellipse is graphically rotated, the following equations are operated to executed graphical rotation processing (Step 60).

$$\alpha_{n+1} = x_{n+1} \cdot \cos\phi - y_{n+1} \cdot \sin\phi$$

$$\beta_{n+1} = x_{n+1} \cdot \sin\phi + y_{n+1} \cdot \cos\phi$$

Then, the following equations are operated to make a command to move x- and y-axis (Step 70).

$$\Delta x = x_{n+1} - x_n \text{ or } \alpha_{n+1} - \alpha_n$$

$$\Delta y_n = y_{n+1} - y_n \text{ or } \beta_{n+1} - \beta_n$$

Then, $x_{n+1}$, $\alpha_{n+1}$ and $y_{n+1}$ are updated by $x_n$, $\alpha_n$ and $y_n$ and $y_n$, respectively (Step 80).

It is judged whether or not the workpiece must be machined in the direction perpendicular to the plane on which the ellipse is located, that is, in z-axis direction (Step 90). Unless the machining in z-axis direction is needed, return to Step 20. Then the process in the Steps from 20 to 80 are executed repeatedly, as a command block.

If the machining in z-axis direction is needed, the following equations are operated to make a command to move the z-axis to output (Step 100).

$$Z_n = \theta_n \cdot K/2\pi$$

$$\Delta Z = Z_{n+1} - Z_n$$

The control updates Zn by substituting Zn+1for it. Then, it returns to Step 20. Then, the process in the Steps from 20 to 80 are executed repeatedly, as a command block.

Figure 5:
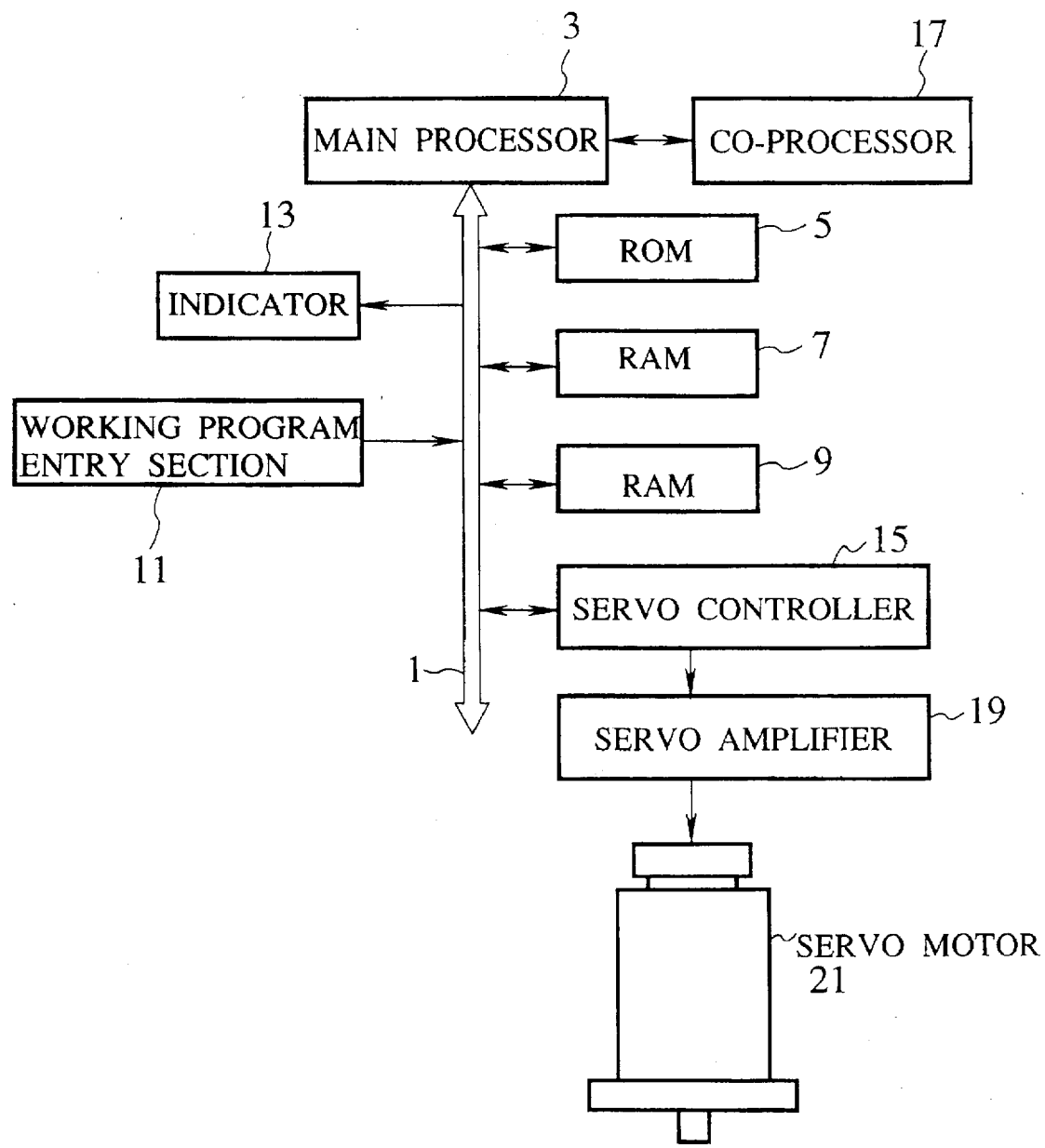
FIG. 5 is a schematic block diagram showing hardware configuration to implement the method of cutting an ellipse contour according to the present invention.

FIG. 5 shows general configuration of the numerically-controlled machine tool to be used in the implementation of the method of cutting the ellipse contour according to the present invention. This numerically-controlled apparatus is consist of a computer system, where a main processor 3, an ROM 5, RAMs 7 and 9, a working program entry section 11, an indicator 13 and a servo controller 15 are connected to one another by a bus 1. A sub-processor 17 is connected with the main processor 3 directly for high speed processing. The ROM 5 stores system programs and the RAM 7 acts as a temporary buffer memory to store data, whereas the RAM 9 stores machining programs entered from the working program entry section 11 and tool data. A servo amplifier 19 for each axes is connected to the servo controller 15, whereas a servo motor 21 is connected to the servo amplifier 19.

According to the process in accordance with the present invention to cut ellipse with numerically-controlled machine tool in which the tool has radius, the target ellipse is cut precisely by the machining programs without complicated calculation. In the process the center point of the tool is controlled to track along the path being away from the ellipse by the distance of the radius of the tool in the normal direction of the ellipse so that the center of the tool moves along the ellipse keeping the distance of the radius of the tool in normal direction of the ellipse.

As the tangential velocity of the tool movement contacting with workpiece is kept constant during the machining of the ellipse contour, the smooth machined ellipse contour can be obtained.

As the coordinate position of the tool is controlled so that the tool moves into the direction perpendicular to the plane on which the ellipse is located in synchronism with the movement to cut ellipse contour, the machining is continuously executed into the direction perpendicular to the plane on which the ellipse is located. As the result, continuous ellipse is cut precisely in the vertical direction.

As the position of the tool is also corrected corresponding to the rotation angle of the ellipse in the orthogonal coordinate system generated by the ellipse contour, the graphically rotated ellipse is precisely cut.

What is claimed is:

1. A method of cutting a contour of an ellipse in a workpiece with a numerically-controlled machine tool having a center and a radius, the ellipse having a center defined by the intersection of major and minor axes, said method comprising:

controlling the coordinate position of the center of the tool to track along a path spaced from the contour of the ellipse, in a direction normal to a cutting surface of the ellipse, by a distance corresponding to the radius of the tool;

wherein the coordinate position of the tool is controlled such that the velocity of a point of contact between the tool and the workpiece in a tangential direction becomes constant at an intersection with the cutting surface of the ellipse, of all vectors also intersecting the center of the ellipse at an eccentric angle relative to the major axis of the ellipse, the eccentric angle being a parameter of the coordinate position.

2. The method of cutting an ellipse as recited in claim 1, wherein the ellipse lies in a plane, and wherein the coordinate position of the tool is controlled such that the tool moves in a direction perpendicular to the plane of ellipse in synchronism with the movement of the tool to cut the contour of the ellipse.

3. The method of cutting an ellipse as recited in claim 1, wherein the ellipse lies in a plane, and wherein the coordinate position of the tool is corrected according to an angular displacement of the ellipse in a rectangular coordinate system on the plane of the ellipse.

4. The method of cutting an ellipse as recited in claim 1, wherein the velocity of the point of contact between the tool and the workpiece is controlled by:

calculating a contact point (Xn, Yn) where the tool and the workpiece contact with each other on the contour of the ellipse with the eccentric angle as a parameter;

calculating a first corrected point $(X_n, Y_n)$ offset by a distance corresponding to the radius of the tool in a normal direction from a contact point (Xn, Yn) on the contour of the ellipse;

calculating a target contact point (Xn+1, Yn+1) on the ellipse at a subsequent sampling time so that a predetermined velocity is achieved between the contact points (Xn, Yn) and (Xn+1, Yn+1);

calculating a second corrected point $(X_{n+1}, Y_{n+1})$ offset by a distance corresponding to the radius of the tool in a normal direction from the target contact point (Xn+1, Yn+1) on the ellipse; and defining a vector from the first corrected point (xn, yn) to the second corrected point $(X_{n+1}, Y_{n+1})$ as a velocity of the center of the tool;

thereby to calculate a velocity of the center of the tool.

5. The method of cutting an ellipse as recited in claim 2, wherein the coordinate position in a perpendicular direction is calculated in the following equation:

$$Zn = \theta n \, K/2\pi$$

where Zn is the coordinate position in a perpendicular direction,

θn is the eccentric angle, and

K is the distance of movement in a perpendicular direction per full circumference of the ellipse.

* * * * *